(12) United States Patent
Cao et al.

(10) Patent No.: US 7,791,717 B2
(45) Date of Patent: Sep. 7, 2010

(54) REFLECTIVE DISPLAY DEVICE TESTING SYSTEM, APPARATUS, AND METHOD

(75) Inventors: Qing-Shan Cao, Shenzhen (CN); Wen-Bo Fa, Shenzhen (CN); Xu-Chen Mu, Shenzhen (CN); Jiang-Yong Zhou, Shenzhen (CN)

(73) Assignees: Ensky Technology (Shenzhen) Co., Ltd., Shenzhen, Guangdong Province; Ensky Technology Co., Ltd., Pan Chiao, Taipei Hsien (TW)

( * ) Notice: Subject to any disclaimer, the term of this patent is extended or adjusted under 35 U.S.C. 154(b) by 203 days.

(21) Appl. No.: 11/753,577

(22) Filed: May 25, 2007

(65) Prior Publication Data
US 2007/0276615 A1    Nov. 29, 2007

(30) Foreign Application Priority Data
May 26, 2006    (CN)    ......................... 2006 1 0060793

(51) Int. Cl.
*G01J 1/00*    (2006.01)
(52) U.S. Cl. ...................................... 356/121; 356/128
(58) Field of Classification Search ................ 356/425, 356/128, 73, 445, 152.2–152.3, 974, 513, 356/369, 132; 438/16–18, 180; 345/204, 345/206, 30, 32, 55; 349/1, 5, 33; 324/770
See application file for complete search history.

(56) References Cited

U.S. PATENT DOCUMENTS

| | | | |
|---|---|---|---|
| 5,406,213 A | | 4/1995 | Henley |
| 5,444,385 A | * | 8/1995 | Henley ......................... 324/752 |
| 6,414,669 B1 | * | 7/2002 | Masazumi .................... 345/98 |
| 7,132,846 B2 | * | 11/2006 | Kim et al. .................... 324/770 |
| 7,301,523 B2 | * | 11/2007 | Kamei ......................... 345/102 |
| 2004/0222813 A1 | | 11/2004 | Kim |
| 2006/0017871 A1 | | 1/2006 | Morimoto |

FOREIGN PATENT DOCUMENTS

| | | |
|---|---|---|
| CN | 1354360 | 6/2002 |
| CN | 100383612 C | 4/2008 |
| TW | 429335 | 4/2001 |

* cited by examiner

*Primary Examiner*—Gregory J Toatley, Jr.
*Assistant Examiner*—Tri T Ton
(74) *Attorney, Agent, or Firm*—Winston Hsu

(57) ABSTRACT

A system for testing a reflective display device includes a testing apparatus and a computer. The testing apparatus includes one or more light emitters, one or more light detectors, an analog-to-digital converter (ADC) module, and a microcontroller unit (MCU). The light emitters are for projecting light onto a reflective display device located on the testing apparatus. The light detectors are for sensing reflected light from the reflective display device, and generating electricity according to a luminance of the reflected light. The ADC module is for receiving the electrical signals from the light detectors, and producing a digital output according to voltages of the electrical signals. The MCU is configured for reading the digital output of the ADC module. The computer is for processing the digital output and displaying results after processing.

18 Claims, 9 Drawing Sheets

US 7,791,717 B2

REFLECTIVE DISPLAY DEVICE TESTING SYSTEM, APPARATUS, AND METHOD

BACKGROUND OF THE INVENTION

1. Field of the Invention

The present invention relates generally to systems, apparatuses, and methods for testing reflective display devices such as reflective liquid crystal displays (LCDs) and electronic paper (e-paper) devices.

2. Description of Related Art

After manufacturing of a reflective display device, parameters of the reflective display device need to be tested before the reflective display device is dispatched for distribution and sale. This helps ensure that the reflective display device will run according to design specifications.

Generally, automated optical inspection (AOI) is used for testing the reflective display device. Because AOI is relatively complex, the cost of AOI can be unduly high.

What is needed is a reflective display device testing system and apparatus, which has a simple configurations and a low price. What is also needed is a reflective display device testing method employing such system and apparatus.

SUMMARY OF THE INVENTION

A system for testing a reflective display device is provided. A preferred embodiment of the system includes a testing apparatus and a computer. The testing apparatus includes one or more light emitters, one or more light detectors, an analog-to-digital converter (ADC) module, and a microcontroller unit (MCU). The one or more light emitters are configured for projecting light onto a reflective display device located on the testing apparatus. The one or more light detectors are configured for sensing reflected light from the reflective display device, and generating one or more electrical signals according to a luminance of the reflected light. The ADC module is configured for receiving the one or more electrical signals from the one or more light detectors, and producing a digital output according to one or more voltages of the one or more electrical signals. The MCU is configured for reading the digital output of the ADC module. The computer is for processing the digital output and displaying one or more results after processing.

An testing apparatus for testing a reflective display device is also provided. A preferred embodiment of the testing apparatus includes one or more light emitters, one or more light detectors, an analog-to-digital converter (ADC) module, and a microcontroller unit (MCU). The one or more light emitters are configured for projecting light onto a reflective display device located on the testing apparatus. The one or more light detectors are configured for sensing reflected light from the reflective display device, and generating one or more electrical signals according to a luminance of the reflected light. The ADC module is configured for receiving the one or more electrical signals from the one or more light detectors, and producing a digital output according to one or more voltages of the one or more electrical signals. The MCU is configured for reading the digital output of the ADC module and processing the digital output and displaying one or more results after processing.

A method for testing reflective display devices is also provided. The method includes the steps of: (a) providing a testing apparatus, which comprises one or more light emitters and one or more light detectors; (b) adjusting luminance of the one or more light emitters; (c) sensing light reflected by a reflective display device that is placed on the testing apparatus by the one or more light detectors and correspondingly generating electricity according to reflected light from the reflective display device; (d) receiving the electricity generated from the one or more light emitters correspondingly and outputting a digital voltage value according to the voltage of the electricity; (e) reading the digital voltage value corresponding to each of one or more light detectors; and (f) processing the voltage values and displaying the processing result.

A method for testing a contrast ratio of a reflective display device is also provided. The method includes the steps of: (a) providing a testing apparatus, which comprises one or more light emitters and one or more light detectors; (b) adjusting luminance of the one or more light emitters to cause the reflective display device at a white gray-scale; (c) sensing light reflected by a reflective display device that is placed on the testing apparatus by the one or more light detectors and correspondingly generating electricity according to reflected light from the reflective display device; (d) receiving the electricity generated from the one or more light emitters correspondingly and outputting a digital voltage value according to the voltage of the electricity; (e) reading the digital voltage value corresponding to each of one or more light detectors; (f) computing an average voltage value ("$V_{ave1}$") of the digital voltage values; (g) adjusting luminance of the light emitters to cause the reflective display device at a black gray-scale; (h) sensing light reflected by a reflective display device that is placed on the testing apparatus by the one or more light detectors and correspondingly generating electricity according to reflected light from the reflective display device; (i) receiving the electricity generated from the one or more light emitters correspondingly and outputting a digital voltage value according to the voltage of the electricity; (j) reading the digital voltage value corresponding to each of one or more light detectors; (k) computing an average voltage value ("$V_{ave2}$") of all the digital voltage values; and (l) computing a contrast ratio (CR) of the reflective display device according to the formula: $CR = V_{ave1}/V_{ave2}$.

A method for testing a uniformity of luminance of a reflective display device is also provided. The method includes the steps of: (a) providing a testing apparatus, which comprises one or more light emitters and one or more light detectors; (b) adjusting luminance of the one or more light emitters to light the reflective display device at a certain gray-scale; (c) sensing light reflected by a reflective display device that is placed on the testing apparatus by the one or more light detectors and correspondingly generating electricity according to reflected light from the reflective display device; (d) receiving the electricity generated from the one or more light emitter correspondingly and outputting a digital voltage value according to the voltage of the electricity; (e) reading a digital voltage value corresponding to each of one or more light detectors; (f) selecting a maximum value ("$V_{max}$") and a minimum value ("$V_{min}$") among all the voltage values; and (g) computing uniformity ("U") of the reflective display device according to a formula: $U = (V_{max} - V_{min})/V_{max}$.

A method for testing a response time of a reflective display device is also provided. The method includes the steps of: (a) providing a testing apparatus, which comprises one or more light emitters and one or more light detectors; (b) adjusting luminance of the one or more light emitters to light the reflective display device at a first gray scale; (c) adjusting luminance of the one or more light emitters to make the reflective display device in a second gray scale; (d) sensing light reflected by a reflective display device that is placed on the testing apparatus by the one or more light detectors and correspondingly generating electricity according to reflected light from the reflective display device; (e) receiving the electricity generated from the one or more light emitter correspondingly and outputting a digital voltage value according to the voltage of the electricity; (f) reading a digital voltage value corresponding to a designated light detector; (g) detecting whether the voltage valued corresponding to the designated light detector is changed; (h) enabling a clock to time when the voltage is changed; (i) reading voltage value corresponding to the designated light detector every a predetermined time; (j) comparing a current voltage value with a previous voltage of the electricity corresponding to the designated light detector; (k) obtaining a time value T from the clock, and records the time value T as the response time when the current voltage is equal to the previous voltage; and (l) displaying the response time T.

Other novel features and advantages will be drawn from the following detailed description of preferred and exemplary embodiments with reference to the attached drawings, in which:

DETAILED DESCRIPTION OF THE INVENTION

Figure 1:
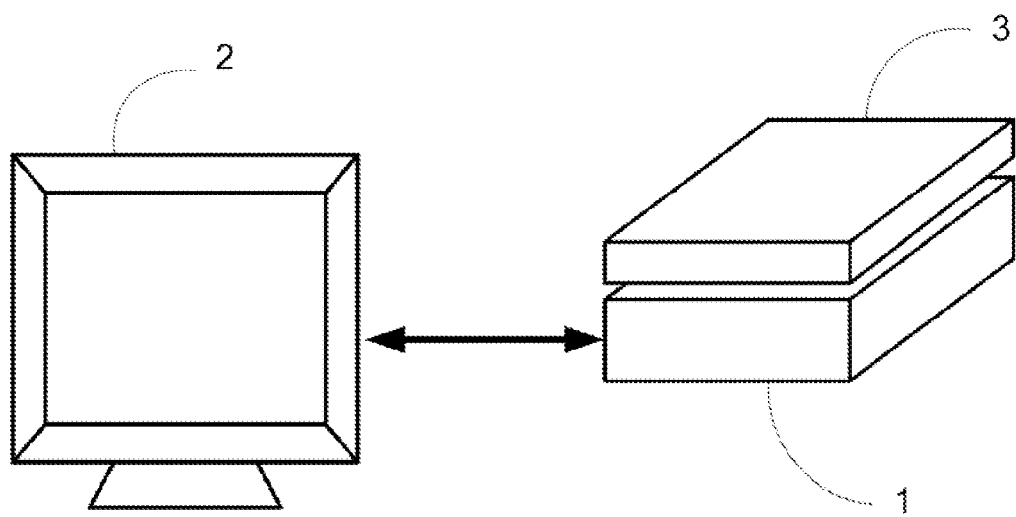
FIG. 1 is a schematic diagram of a reflective display device testing system (hereinafter, "the system") in accordance with a first preferred embodiment of the present invention together with a reflective display device to be tested, the system including a computer and a testing apparatus.

FIG. 1 is a schematic diagram of a reflective display device testing system (hereinafter, "the system") in accordance with a preferred embodiment of the present invention, together with a reflective display device to be tested. The system includes a testing apparatus 1 and a computer 2. The testing apparatus 1 is connected to the computer 2 through a serial interface such as an Universal Serial Bus (USB) interface or a wireless connection such as an infrared port. The testing apparatus 1 is used for testing the reflective display device 3, which is placed on top of the testing apparatus 1. The reflective display device 3 may for example be a reflective liquid crystal display (LCD) or an electronic paper (e-paper) device). The computer 2 is provided for processing data transmitted from the testing apparatus 1, and displaying results after processing.

Figure 2:
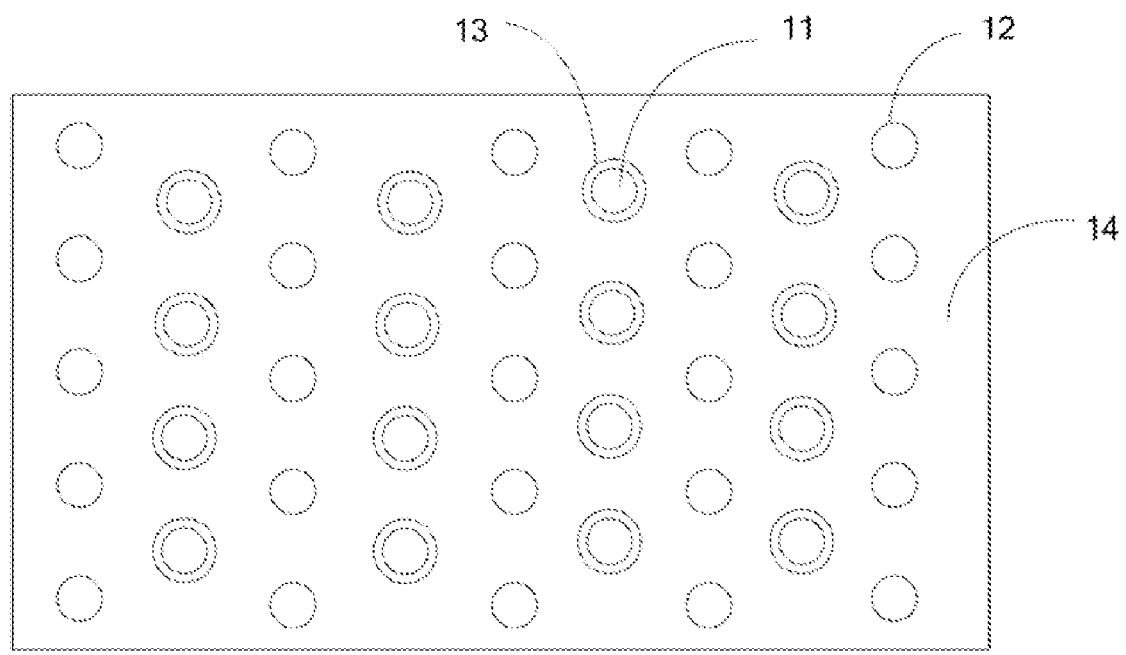
FIG. 2 is a plan view of the testing apparatus of the system of FIG. 1.

FIG. 2 is a plan view of the testing apparatus of FIG. 1. The testing apparatus includes a platform 14, one or more light emitters 11, and one or more light detectors 12. In the preferred embodiment, there are a plurality of light emitters 11 and a plurality of light detectors 12. The light emitters 11 are arranged in a first matrix, and the light detectors are arranged in a second matrix. Furthermore, as viewed in FIG. 2, the light emitters 11 and the light detectors 12 are arranged on the platform 14 in alternate columns. In the preferred embodiment, each of the light emitters 11 is a light emitting diode (LED), and each of the light detectors 12 is an Agilent light photo sensor. Each of the light emitters 11 is surrounded by a wall 13 that extends vertically from the testing apparatus 1, to prevent the light detectors 12 from directly detecting light emitted from the light emitters 11.

Figure 3:
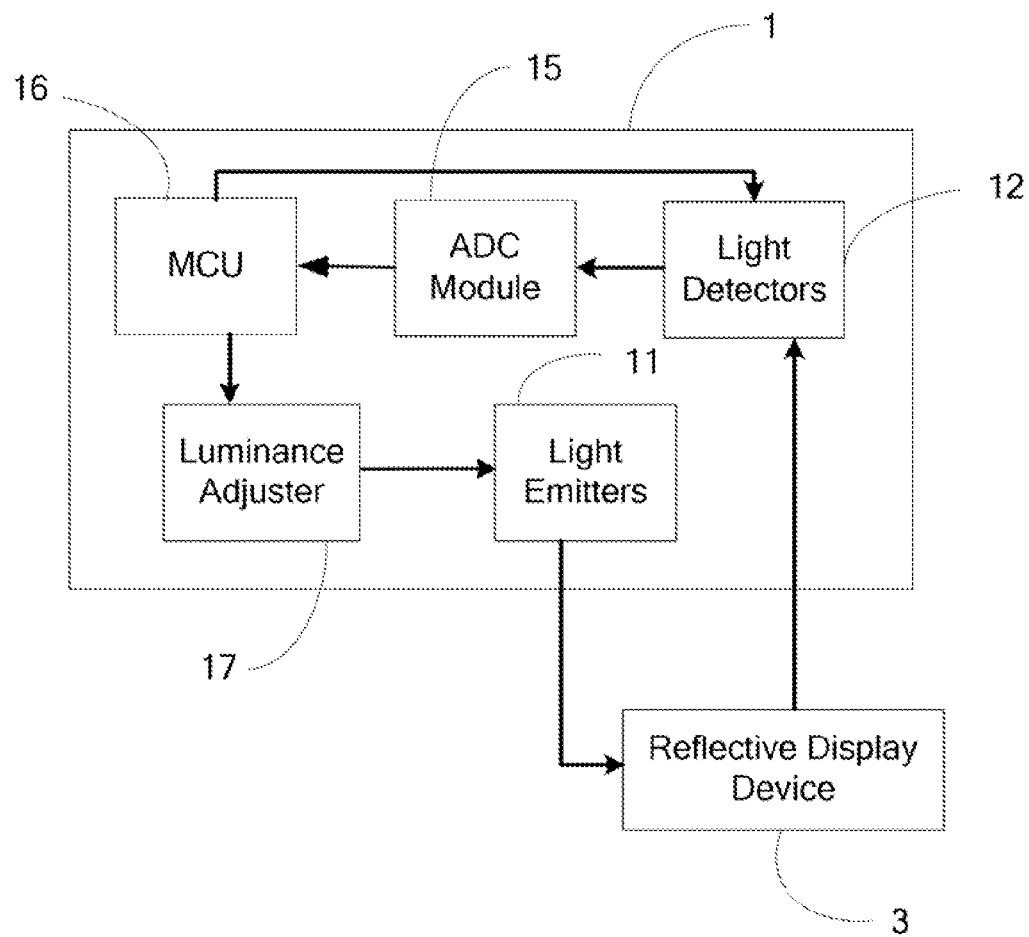
FIG. 3 is a block diagram of the testing apparatus and reflective display device of FIG. 1.

FIG. 3 is a block diagram of the testing apparatus 1 and reflective display device 3. The testing apparatus 1 further includes an analog-to-digital converter (ADC) module 15, a microcontroller unit (MCU) 16, and a luminance adjuster 17. The ADC module 15 is configured with one or more input channels to receive electrical signals received from the light detectors 12. Such electrical signals are generated by the light detectors 12 in response to light received from the reflective display device 3. The ADC module 15 outputs a digital output according to voltages of the electrical signals received from the light detectors 12. In the preferred embodiment, the ADC module 15 can include a single channel analog-to-digital converter (ADC), a multichannel ADC, or any combination thereof. An amount of the input channels of the ADC module 15 corresponds to an amount of the light detectors 12. The ADC module 15 is connected to the MCU 16 by an Inter-integrated Circuit (I2C) bus. In the preferred embodiment, a pulse wave modulator (PWM) is used as the luminance adjuster 17. The luminance adjuster 17 is configured to control the light emitters 11 to emit light with a uniform luminance.

During a testing process, the reflective display device 3 is placed on top of the testing apparatus 1. The luminance adjuster 17 adjusts a luminance of the light emitters 11, so that the light emitters 11 emit light with a uniform luminance. Each of the light detectors 12 senses light correspondingly reflected by the reflective display device 3, and generates a corresponding electrical signal. The electrical signal is then transmitted to the ADC module 15. The ADC module 15 periodically outputs a digital output according to voltages of the electrical signals received at the input channels. When the MCU 16 receives a read instruction from the computer 2, the MCU 16 reads the digital output in order to obtain the voltages of the electrical signals received from the input channels. Thereby, the MCU 16 obtains the voltage (hereinafter, "voltage value") generated by each of the light detectors 12. The voltage values are then sent to the computer 2, for the computer 2 to compute test results.

Figure 4:
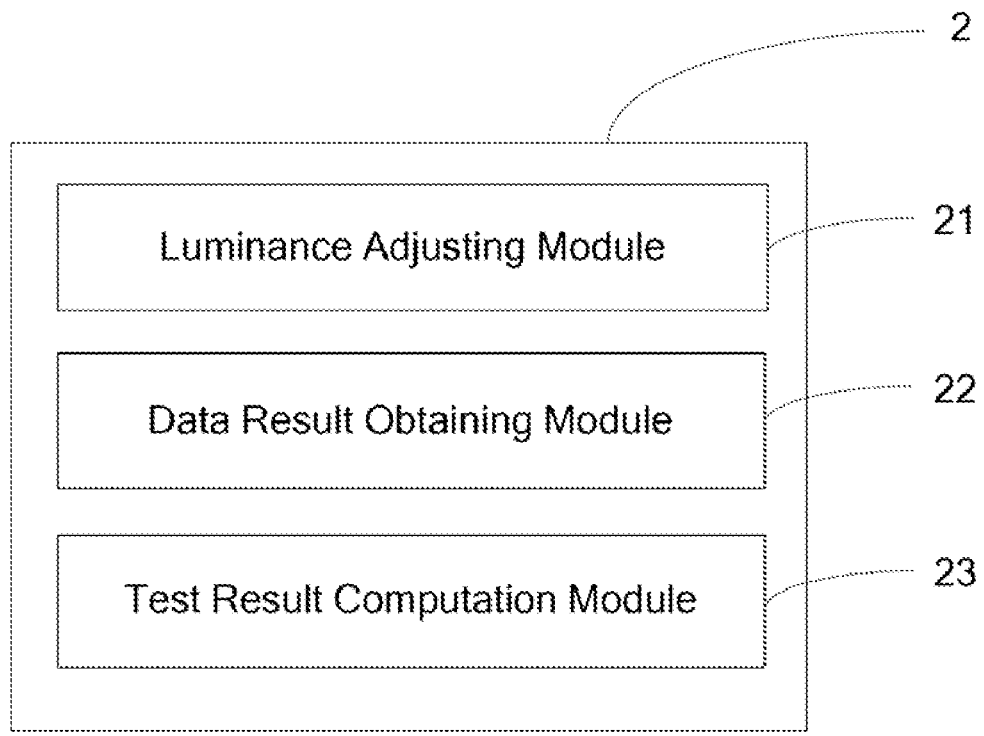
FIG. 4 is a schematic diagram of main function modules of the computer of the system of FIG. 1.

FIG. 4 is a schematic diagram of main function modules of the computer 2. The computer 2 includes a luminance adjusting module 21, a data result obtaining module 22, and a test result computation module 23. The luminance adjusting module 21 is configured to generate an adjust instruction, which signals the luminance adjuster 17 of the testing apparatus 1 to adjust the luminance of the light emitters 11. The data result obtaining module 22 is configured to respond to a read instruction, and thereby obtain the voltage values from the MCU 16. The test result computation module 23 is configured for processing the voltage values to compute test results. The test results, may, for example, relate to contrast ratio, uniformity of luminance, and response time of the reflective display device 3.

Figure 5:
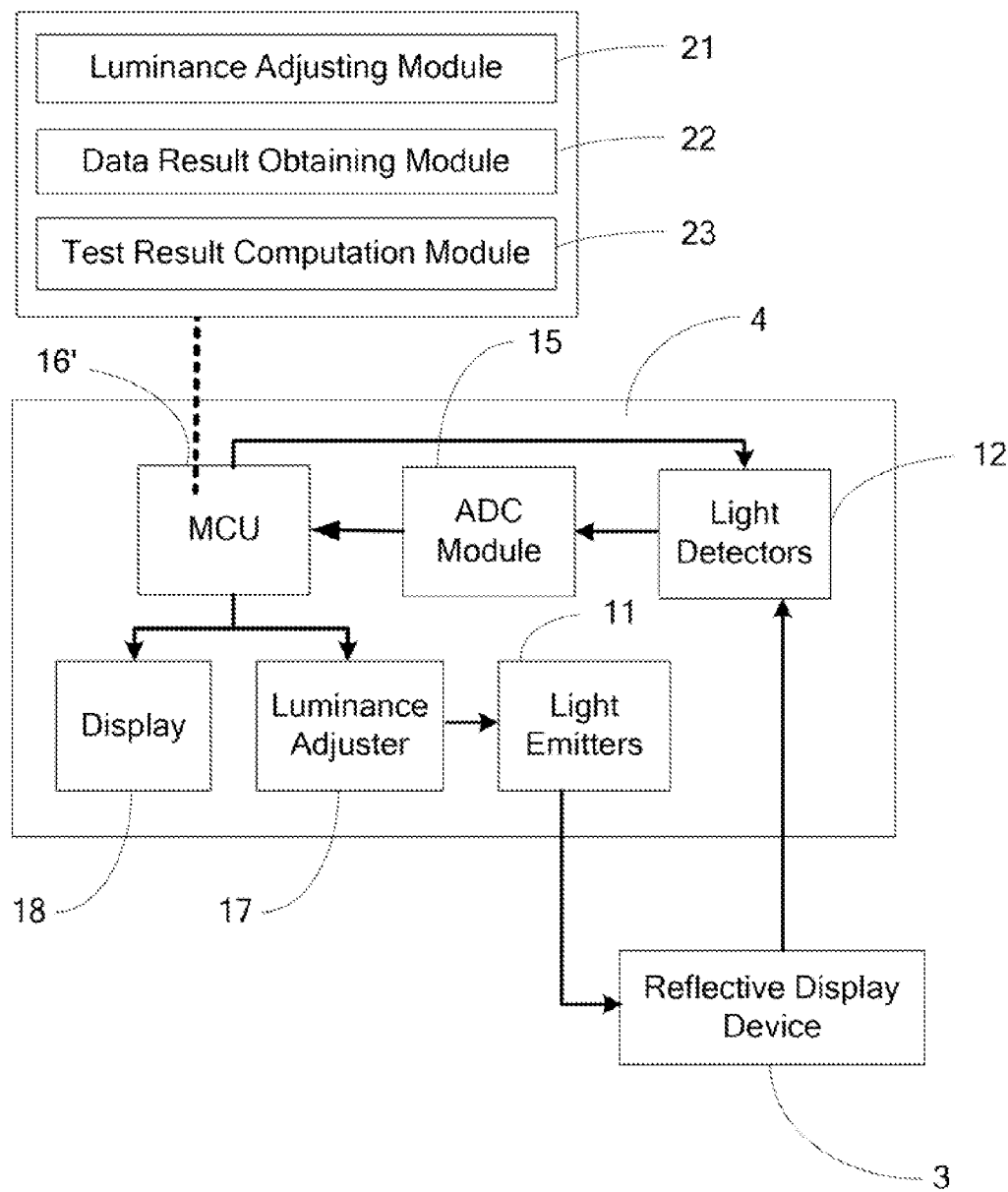
FIG. 5 is a block diagram of a reflective display device testing system in accordance with a second preferred embodiment of the present invention, together with a reflective display device to be tested.

FIG. 5 is a block diagram of a reflective display device testing system (hereinafter, "the system") in accordance with a second preferred embodiment of the present invention. In the second preferred embodiment, the system simply consists of a testing apparatus 4. The testing apparatus 4 is in effect a consolidation of the functions of the testing apparatus 1 and computer 2 of the first preferred embodiment. In particular, the testing apparatus 4 includes an MCU 16' and a display 18. The MCU 16' includes the luminance adjusting module 21, the data result obtaining module 22, and the test result computation module 23. The display 18 is for displaying test results. The testing apparatus 4 also includes other components and functions similar to or the same as those of the testing apparatus 1.

Figure 6:
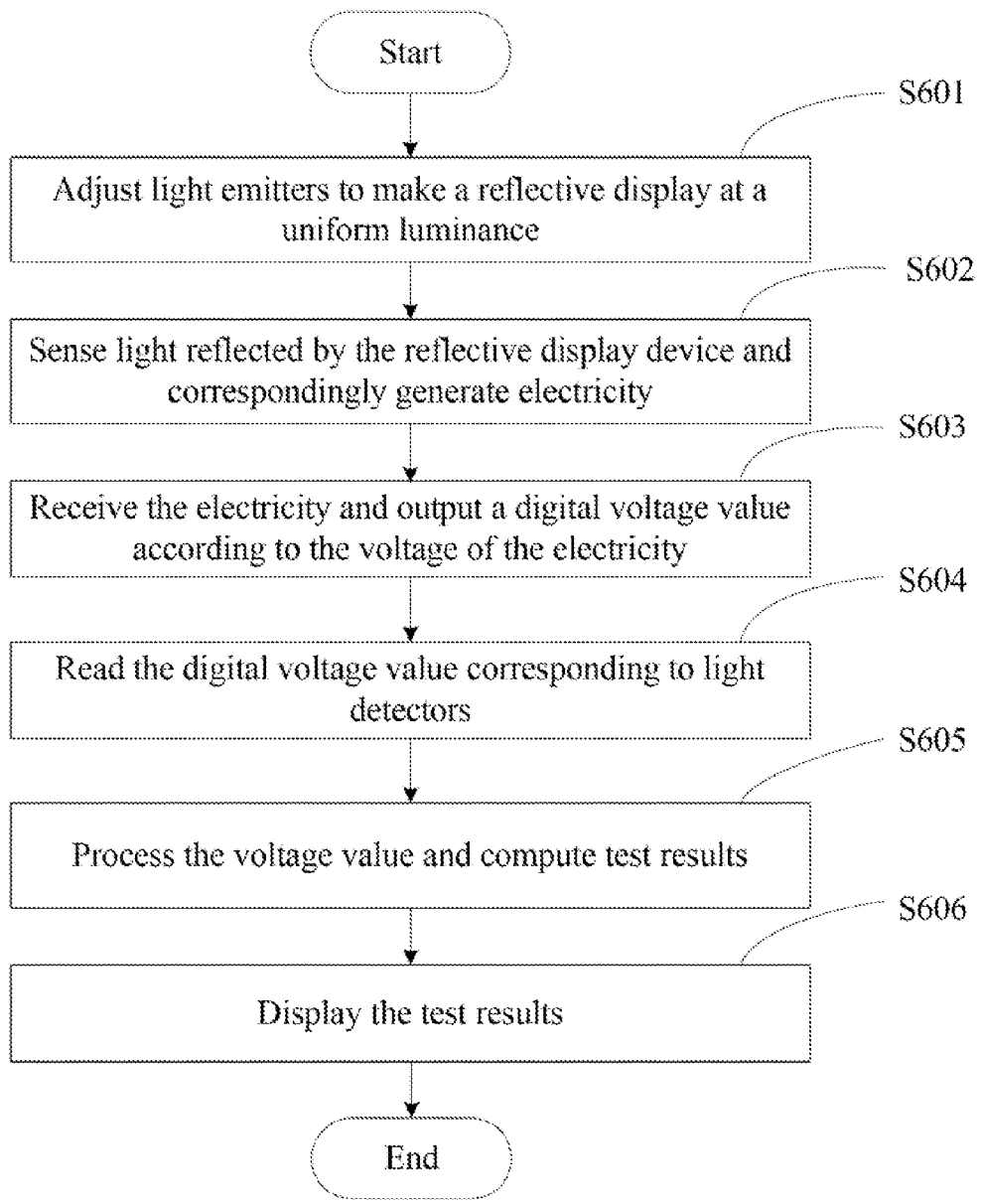
FIG. 6 is a flow chart of a preferred method for testing a reflective display device by using the system of FIG. 1 or FIG. 5.

FIG. 6 is a flow chart of a preferred method for testing the reflective display device 3 by using either the system of the first preferred embodiment or the system of the second preferred embodiment.

In step S601, the luminance adjusting module 21 generates an adjust instruction, which signals the luminance adjuster 17 of the testing apparatus 1 to adjust the light emitters 11 to emit light at a uniform luminance.

In step S602, the light detectors 12 senses light reflected by the reflective display device 3 and correspondingly generates electricity according to reflected light from the reflective display device 3 and the electricity is transmitted to the ADC module 15.

In step S603, the ADC module 15 receive the electricity generated from the one or more light emitters 11 correspondingly and outputs a digital voltage value according to the voltage of the electricity.

In step S604, the data result obtaining module 22 reads the digital voltage value corresponding to each of the light detectors.

In step S605, the test result computation module 23 processes the voltage value and computes test results of the reflective display device 3.

In step S606, the test result computation module 23 displays the test results.

The following descriptions indicate how to use the method described above to test different parameters of the reflective display device 3.

Figure 7:
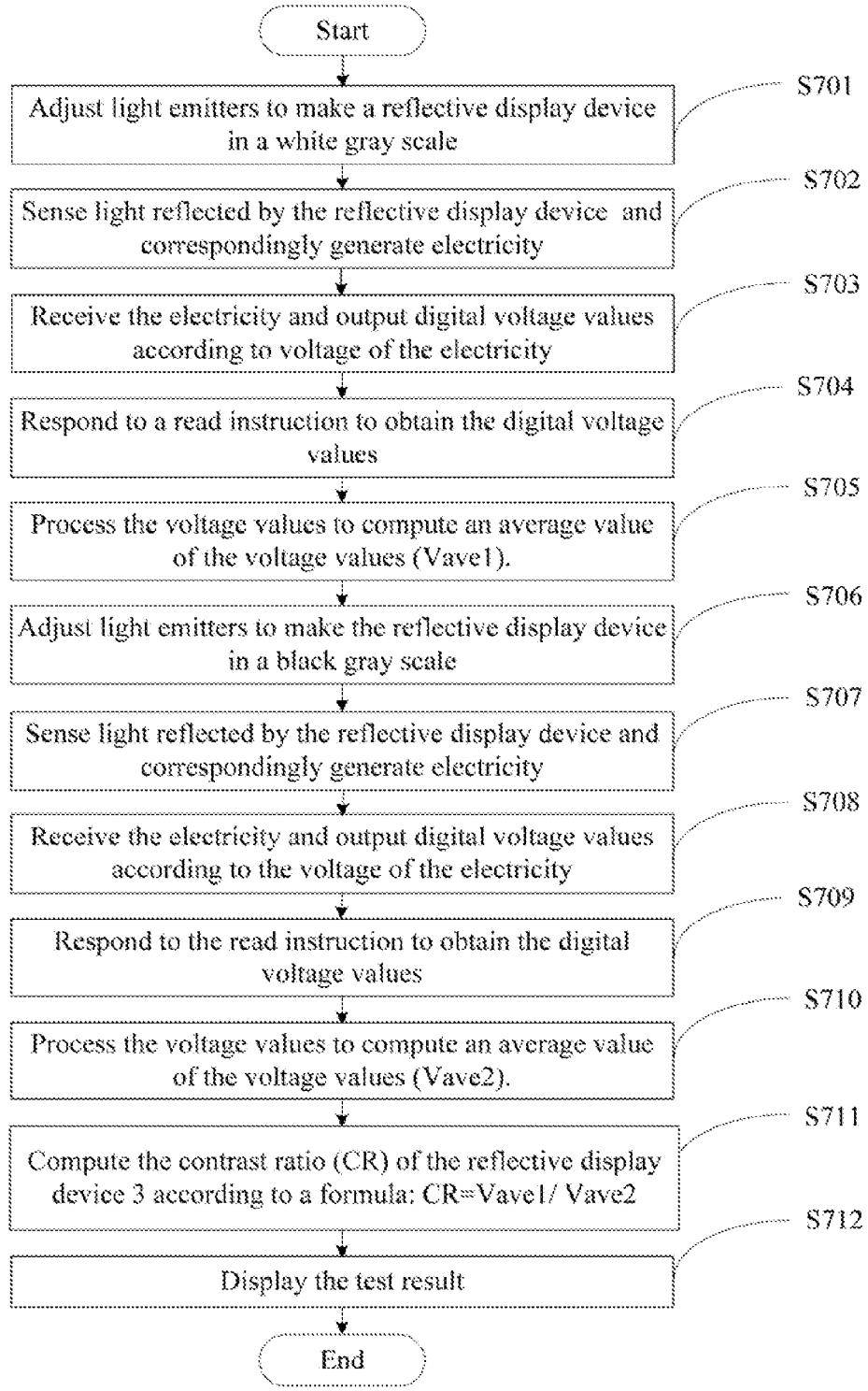
FIG. 7 is a flow chart of a preferred method for testing a contrast ratio of a reflective display device by using the system of FIG. 1 or FIG. 5.

Referring to FIG. 7, a flowchart of a preferred method for testing a contrast ratio of the reflective display device 3 is shown.

In step S701, the luminance adjusting module 21 generates the adjust instruction that signals the luminance adjuster 17 of the testing apparatus 1 to adjust the one or more light emitters 11, thus causing the reflective display device 3 in a white gray scale.

In step S702, the light detectors 12 senses light reflected by the reflective display device 3 and correspondingly generates electricity according to the reflected light from the reflective display device 3 and the electricity is transmitted to the ADC module 15.

In step S703, the ADC module 15 receive the electricity generated from the one or more light emitters 11 correspondingly and outputs a digital voltage value according to the voltage of the electricity.

In step S704, the data result obtaining module 22 data result obtaining module 22 responds to the read instruction to obtain the digital voltage value corresponding to each of the one or more light detectors 12.

In step S705, the test result computation module 23 processes the voltage values of all the one all more light detectors 12 to compute an average value of the voltage values ("Vave1").

In step S706, the luminance adjusting module 21 generates the adjust instruction that signals the luminance adjuster 17 of the testing apparatus 1 to adjust the one or more light emitters 11, thus causing the reflective display device 3 in a black gray scale.

In step S707, the light detectors 12 senses light reflected by the reflective display device 3 and correspondingly generates electricity according to reflected light from the reflective display device 3 and the electricity is transmitted to the ADC module 15.

In step S708, the ADC module 15 receive the electricity generated from the one or more light emitters 11 correspondingly and outputs the digital voltage value according to the voltage of the electricity.

In step S709, the data result obtaining module 22 responds to the read instruction to obtain the digital voltage value corresponding to each of one or more light detectors 12.

In step S710, the test result computation module 23 processes all the voltage values of the one or more light detectors 12 to compute an average value of the voltage values ("Vave2").

In step S711, the test result computation module 23 computes the contrast ratio ("CR") of the reflective display device 3 according to a formula: $CR=V_{ave1}/V_{ave2}$.

In step S712, the test result computation module 23 displays the test result, i.e., CR.

Figure 8:
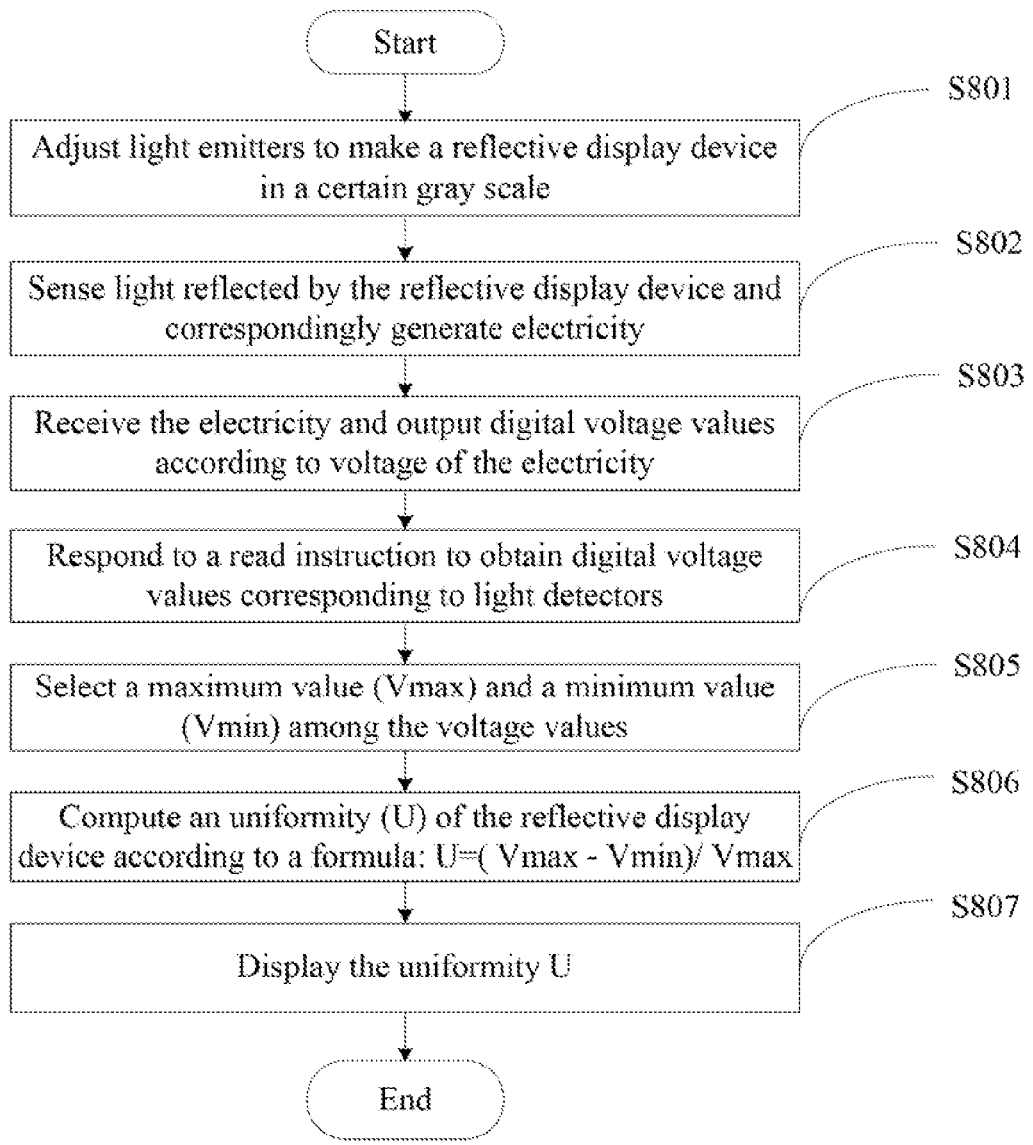
FIG. 8 is a flow chart of a preferred method for testing uniformity of luminance of a reflective display device by using the system of FIG. 1 or FIG. 5.

Referring to FIG. 8, a flowchart of a preferred method for testing a uniformity of luminance of the reflective display device 3 is shown.

In step S801, the luminance adjusting module 21 generates the adjust instruction that signals the luminance adjuster 17 of the testing apparatus 1 to adjust the one or more light emitters 11, thus causing the reflective display device 3 in a certain gray-scale such as white gray scale.

In step S802, the light detectors 12 sense light reflected by the reflective display device 3 and correspondingly generate electricity according to the reflected light from the reflective display device 3 and the electricity is transmitted to the ADC module 15.

In step S803, the ADC module 15 receives the electricity generated from the light emitters 11 correspondingly and outputs a digital voltage value according to the voltage of the electricity.

In step S804, the data result obtaining module 22 responds to the read instruction to obtain the digital voltage value corresponding to each of light detectors 12.

In step S805, the test result computation module 23 selects a maximum value ("Vmax") and a minimum value ("Vmin") among the voltage values corresponding to the light detectors 12.

In step S806, the test result computation module 23 computes the uniformity ("U") of luminance of the reflective display device 3 according to a formula: $U=(Vmax-Vmin)/Vmax$.

In step S807, the test result deriving module 23 displays the uniformity U.

Figure 9:
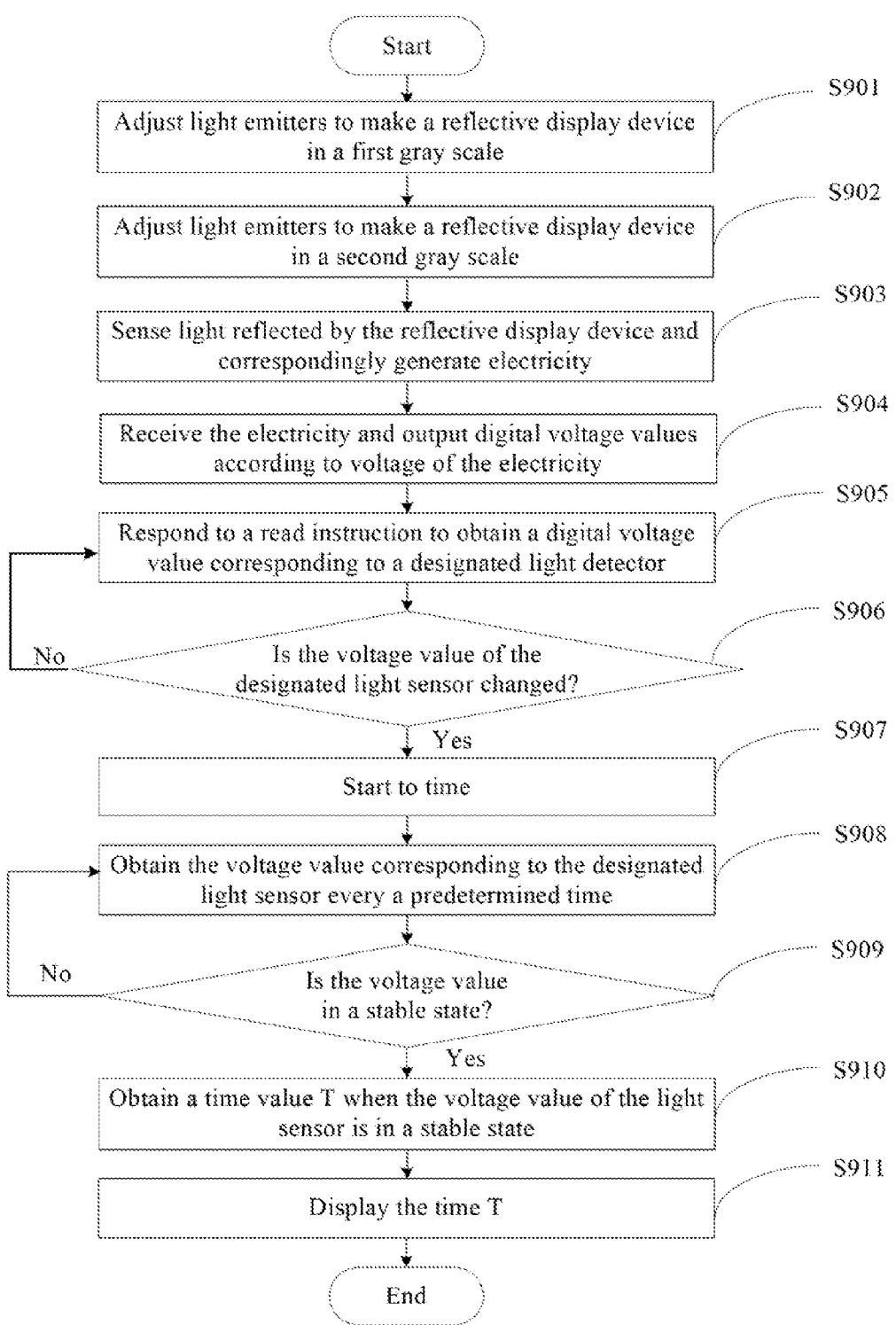
FIG. 9 is a flow chart of a preferred method for testing a response time of a reflective display device by using the system of FIG. 1 or FIG. 5.

Referring to FIG. 9, a flowchart of a preferred method for testing a response time of the reflective display device 3 is shown.

In step S901, the luminance adjusting module 21 generates the adjust instruction that signals the luminance adjuster 17 of the testing apparatus 1 to adjust the light emitters 11, thus causing the reflective display device 3 in a first gray-scale such as white gray scale.

In step S902, the luminance adjusting module 21 generates an adjust instruction that signals the luminance adjuster 17 of the testing apparatus 1 to adjust the light emitters 11, thus causing the reflective display device 3 in a second gray-scale such as black gray scale.

In step S903, the light detectors 12 senses light reflected by the reflective display device 3 and correspondingly generates electricity according to reflected light from the reflective display device 3 and the electricity is transmitted to the ADC module 15.

In step S904, the ADC module 15 receives the electricity generated from the light emitters 11 correspondingly and outputs a digital voltage value according to the voltage of the electricity.

In step S905, data result obtaining module 22 responds to the read instruction to obtain the digital voltage value corresponding to a designated light detectors 12.

In step S906, the test result computation module 23 detects whether the voltage value corresponding to a designated light detector is changed, if the voltage value is not changed, the procedure goes back to the step S905.

In step S907, if the voltage value is changed, the test result computation module 23 enables a clock (not shown) to time.

In step S908, the data result obtaining module 22 reads the voltage value corresponding to the designated light detectors 12 every a predetermined time.

In step S909, the test result computation module 23 compares a current voltage value with a previous voltage value corresponding to the designated light detector 12 to detect whether the voltage value is in a stable state. If the current voltage value is not equal to the previous voltage value, namely, the voltage value is not in the stable state, the procedure goes back to step S908.

If the current voltage value is equal to the previous voltage value, namely, the voltage value is in the stable state, in step S910, the test result computation module 23 obtains a time value T from the clock, and records the time value T as the response time.

In step S911, the test result computation module 23 displays the response time.

Although the present invention has been specifically described on the basis of preferred and exemplary embodiments, the invention is not to be construed as being limited thereto. Various changes or modifications may be made to the embodiments without departing from the scope and spirit of the invention as recited in the claims and equivalents thereof.

What is claimed is:

1. A system for testing a reflective display device, comprising:
   a testing apparatus, comprising:
      a plurality of light emitters configured for projecting light onto a reflective display device located on the testing apparatus; wherein the reflective display device reflects the light directly projected from the plurality of light emitters onto and covering all visible surface of the liquid crystal display;
      a plurality of light detectors configured for sensing reflected light from the reflective display device, and generating one or more electrical signals according to a luminance of the reflected light; wherein the light emitters and the light detectors are arranged on a platform of the testing apparatus in alternate columns;
      an analog-to-digital converter (ADC) module configured for receiving the one or more electrical signals from the plurality of light detectors, and producing a digital output according to one or more voltages of the one or more electrical signals;
   a microcontroller unit (MCU) configured for reading the digital output of the ADC module; and
   a computer for processing the digital output and displaying one or more results after processing.

2. The system as described in claim 1, wherein each of the one or more light emitters are surrounded by a wall that extends vertically from the testing apparatus to prevent the light detectors from directly detecting light from the light emitters.

3. The system as described in claim 1, wherein the testing apparatus further comprises a luminance adjuster for varying a luminance of the plurality of light emitters.

4. The system as described in claim 3, wherein the luminance adjuster is pulse width modulator (PWM).

5. The system as described in claim 1, wherein each of the plurality of light emitters is a light emitting diode (LED).

6. The system as described in claim 1, wherein each of the plurality of light detectors is Agilent light detector.

7. The system as described in claim 1, wherein the ADC module includes a single channel analog-to-digital converter (ADC), a multichannel ADC, or any combination thereof.

8. An apparatus for testing a reflective display device, comprising:
   a plurality of light emitters configured for projecting light onto a reflective display device located on the testing apparatus;
   a plurality of light detectors configured for sensing reflected light from the reflective display device, and generating one or more electrical signals according to a luminance of the reflected light; wherein the light emitters and the light detectors are arranged on a platform of the testing apparatus in alternate columns;
   an analog-to-digital converter (ADC) module configured for receiving the one or more electrical signals from the plurality of light detectors, and producing a digital output according to one or more voltages of the one or more electrical signals; and
   a microcontroller unit (MCU) configured for reading the digital output of the ADC module and processing the digital output and displaying one or more results after processing.

9. The apparatus as described in claim 8, wherein each of the plurality of light emitters are surrounded by a wall that extends vertically from the testing apparatus to prevent the light detectors from directly detecting light from the light emitters.

10. The apparatus as described in claim 8, wherein the testing apparatus further comprises a luminance adjuster for varying a luminance of the light emitters.

11. The apparatus as described in claim 10, wherein the luminance adjuster is pulse width modulator (PWM).

12. The apparatus as described in claim 9, wherein each of the plurality of light emitters is a light emitting diode (LED).

13. The apparatus as described in claim 9, wherein each of the plurality of light detectors is Agilent light detector.

14. The apparatus as described in claim 8, wherein the ADC module is selected from a group composing of an ADC and a multichannel ADC and any combination thereof.

15. A method for testing reflective display devices, comprising:
   (a) providing a testing apparatus, which comprises a plurality of light emitters and a plurality of light detectors; wherein the reflective display device reflects the light directly projected from the plurality of light emitters onto and covering all visible surface of the liquid crystal display and the light emitters and the light detectors are arranged on a platform of the testing apparatus in alternate columns;

(b) adjusting a luminance of the plurality of light emitters;

(c) sensing the reflected light and not for light reflected by from a reflective display device that is placed on the testing apparatus by the plurality of light detectors and correspondingly generating electricity according to reflected light from the reflective display device;

(d) receiving the electricity generated from the plurality of light emitters correspondingly and outputting a digital voltage value according to the voltage of the electricity;

(e) reading the digital voltage value corresponding to each of plurality of light detectors; and (f) processing the digital voltage values and displaying the processing result.

16. The method as described in claim 15, wherein:
step (b) further comprises:
adjusting the luminance of the plurality of light emitters to cause the reflective display device at a white gray-scale; and
adjusting the luminance of the light emitters to cause the reflective display device at a black gray-scale; and
step (f) further comprises:
computing an average voltage value ("Vave1") of all the digital voltage values read when the reflective display device at a white gray-scale;
computing an average voltage value ("Vave2") of all the digital voltage values read when the reflective display device at a black gray-scale; and
computing a contrast ratio (CR) of the reflective display device according to a formula: CR=Vave1/Vave2.

17. The method as described in claim 15, wherein:
step (b) further comprises adjusting the luminance of the plurality of light emitters to light the reflective display device at a certain gray-scale;
step (f) further comprises: selecting a maximum value ("Vmax") and a minimum value ("Vmin") among all the digital voltage values; and
computing a uniformity ("U") of luminance of the reflective display device according to the formula: U=(Vmax−Vmin)/Vmax.

18. The method as described in claim 15, wherein:
step (b) further comprises:
adjusting the luminance of the plurality of light emitters to light the reflective display device at a first gray scale; and
adjusting the luminance of the plurality of light emitters to make the reflective display device at a second gray scale;
step (e) further comprises:
reading a digital voltage value corresponding to a designated light detector every a predetermined time;
step (f) further comprises:
detecting whether the digital voltage valued corresponding to the designated light detector is changed;
enabling a clock to time when the digital voltage value is changed;
comparing a current digital voltage value with a previous digital voltage value of the electricity corresponding to the designated light detector; obtaining a time value T from the clock, and records the time value T as the response time when the current digital voltage value is not equal to the previous digital voltage value; and
displaying the response time T.

* * * * *